(12) United States Patent
Weber

(10) Patent No.: US 11,857,964 B2
(45) Date of Patent: Jan. 2, 2024

(54) FLOW CELL HAVING A HOUSING COMPONENT

(71) Applicant: THINXXS MICROTECHNOLOGY GMBH, Zweibrücken (DE)

(72) Inventor: Lutz Weber, Münchweiler (DE)

(73) Assignee: THINXXS MICROTECHNOLOGY GMBH, Zweibrücken (DE)

( * ) Notice: Subject to any disclaimer, the term of this patent is extended or adjusted under 35 U.S.C. 154(b) by 240 days.

(21) Appl. No.: 16/611,623

(22) PCT Filed: Apr. 5, 2018

(86) PCT No.: PCT/EP2018/058670
§ 371 (c)(1),
(2) Date: Nov. 7, 2019

(87) PCT Pub. No.: WO2018/215126
PCT Pub. Date: Nov. 29, 2018

(65) Prior Publication Data
US 2020/0156069 A1  May 21, 2020

(30) Foreign Application Priority Data
May 26, 2017  (EP) .................................. 17172994

(51) Int. Cl.
*B01L 3/00* (2006.01)
*B29C 65/08* (2006.01)
(Continued)

(52) U.S. Cl.
CPC ... *B01L 3/502738* (2013.01); *B01L 3/502707* (2013.01); *B01L 2300/041* (2013.01);
(Continued)

(58) Field of Classification Search
CPC ....... B01L 2200/027; B01L 2200/0689; B01L 2300/041; B01L 2300/043;
(Continued)

(56) References Cited

U.S. PATENT DOCUMENTS 10,183,293 B2   1/2019  Weber
2006/0215155 A1*  9/2006  Weber ..................... B29C 65/58
356/246

(Continued)

FOREIGN PATENT DOCUMENTS

EP   2962758 A1   1/2016
JP   2002018800 A *  1/2002   .............. G01F 11/28
(Continued)

OTHER PUBLICATIONS

Zhang, B., Dong, Q., Korman, C. et al. Flexible packaging of solid-state integrated circuit chips with elastomeric microfluidics. Sci Rep 3, 1098 (2013). https://doi.org/10.1038/srep01098 (Year: 2013).*

(Continued)

*Primary Examiner* — Jennifer Wecker
*Assistant Examiner* — Jonathan Bortoli
(74) *Attorney, Agent, or Firm* — LUCAS & MERCANTI, LLP; Klaus P. Stoffel

(57) ABSTRACT

A microfluidic flow cell for carrying out an analysis, having a substrate of synthetic material, which has cavities for the formation of channel structures and chambers, wherein the cavities are closed on one side of the substrate by a film adhesively bonded or welded to the substrate, and having a housing component that is produced with a hard and a soft component, which, on the side of the substrate facing away from the film, is connected to the substrate, completing functional sections respectively fulfilling the function of the (Continued)

flow cell. The housing component is formed as a multifunctional part completing more than two functional sections.

11 Claims, 6 Drawing Sheets

(51) Int. Cl.
*B29C 65/60* (2006.01)
*B29C 65/00* (2006.01)
*B29L 31/00* (2006.01)

(52) U.S. Cl.
CPC . *B01L 2300/044* (2013.01); *B01L 2300/0816* (2013.01); *B01L 2300/0883* (2013.01); *B01L 2300/123* (2013.01); *B01L 2300/16* (2013.01); *B01L 2400/06* (2013.01); *B29C 65/08* (2013.01); *B29C 65/606* (2013.01); *B29C 66/71* (2013.01); *B29L 2031/756* (2013.01)

(58) Field of Classification Search
CPC ....... B01L 2300/044; B01L 2300/0816; B01L 2300/0883; B01L 2300/0887; B01L 2300/123; B01L 2300/16; B01L 2400/0481; B01L 2400/0487; B01L 2400/06; B01L 2400/0655; B01L 3/502707; B01L 3/50273; B01L 3/502738; B29C 65/02; B29C 65/08; B29C 65/48; B29C 65/5057; B29C 65/606; B29C 66/112; B29C 66/1122; B29C 66/131; B29C 66/21; B29C 66/30223; B29C 66/53461; B29C 66/54; B29C 66/71; B29C 66/712; B29C 66/73151; B29C 66/73152; B29C 66/7392; B29C 66/8322; B29L 2031/756; B29K 2021/00; B29K 2021/003; B29K 2023/12; B29K 2083/00
See application file for complete search history.

(56) References Cited

U.S. PATENT DOCUMENTS

| | | | |
|---|---|---|---|
| 2011/0186466 A1* | 8/2011 | Kurowski | B01L 3/502715 220/4.01 |
| 2011/0195301 A1* | 8/2011 | Taniguchi | H01M 50/24 29/623.2 |
| 2012/0177543 A1* | 7/2012 | Battrell | F04B 43/043 422/187 |
| 2014/0150878 A1* | 6/2014 | Merry | F16K 31/00 137/1 |

FOREIGN PATENT DOCUMENTS

| | | | | |
|---|---|---|---|---|
| WO | 2015073999 A1 | | 5/2015 | |
| WO | WO-2015073999 A1 | * | 5/2015 | ........... C12Q 1/6888 |
| WO | WO-2016000998 A1 | * | 1/2016 | ........ B01L 3/502707 |
| WO | 2016051272 A1 | | 4/2016 | |

OTHER PUBLICATIONS

Christov ("Soft hydraulics: from Newtonian to complex fluid flows through compliant conduits") Journal of Physics Condensed Matter 34(6):063001 (Year: 2021).*

* cited by examiner

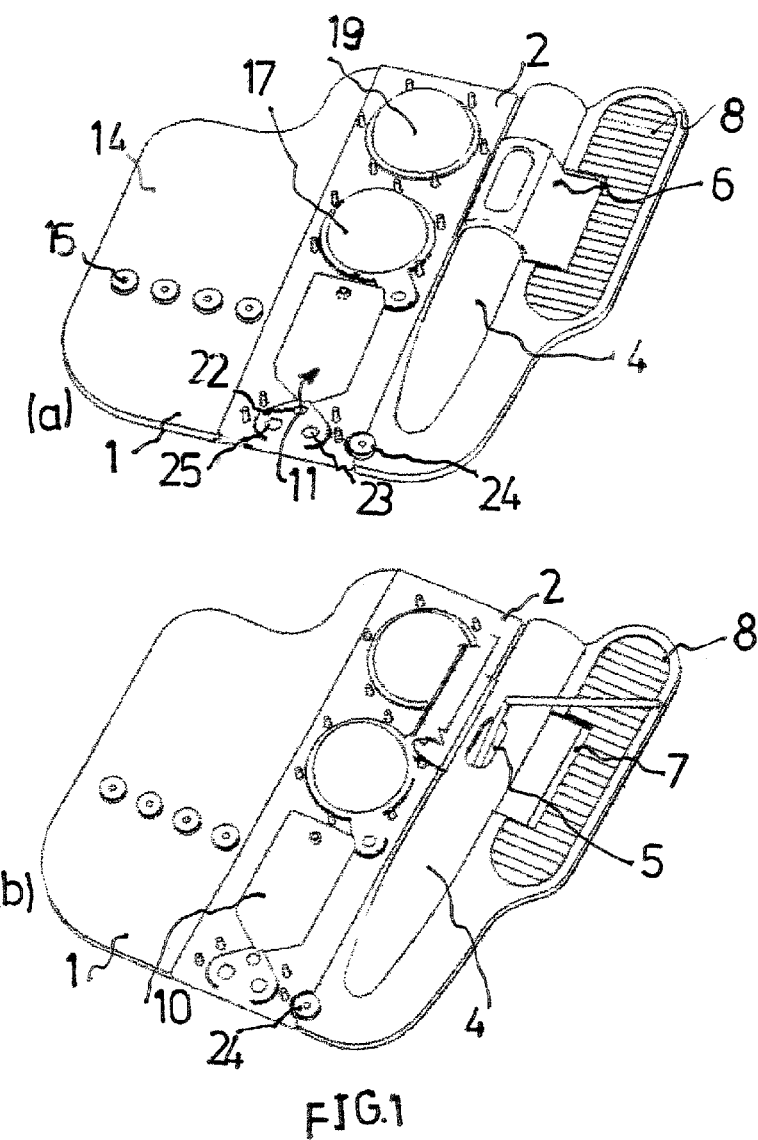
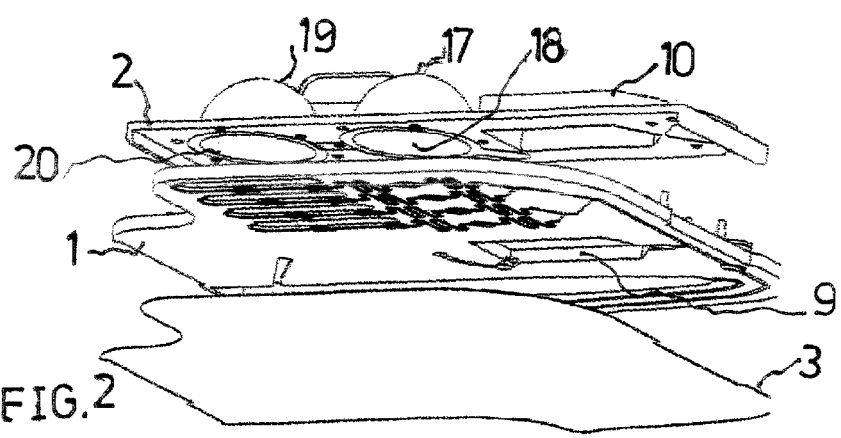
FIG.1
FIG.2

(a)

(b)

(a)

(b)

FLOW CELL HAVING A HOUSING COMPONENT

The present application is a 371 of International application PCT/EP2018/058670, filed Apr. 5, 2018, which claims priority of EP 17172994.0, filed May 26, 2017, the priority of these applications is hereby claimed and these applications are incorporated herein by reference.

BACKGROUND OF THE INVENTION

The invention relates to a microfluidic flow cell for carrying out an analysis, having a substrate made of plastic, which comprises cavities for forming channel structures and chambers, the cavities being closed on one side of the substrate by a film adhesively bonded or welded to the substrate, and having a housing component which is produced as a composite part having a hard and a soft constituent and is connected to the substrate on a side of the substrate facing away from the film while respectively complementing functional sections that respectively fulfill a function of the flow cell.

A microfluidic flow cell having these features is disclosed by WO 16/051272 A1. Inter alia, a pump device comprising the soft constituent of the housing component is formed as a functional section.

SUMMARY OF THE INVENTION

Such a microfluidic flow cell is developed further by the invention in such a way that the housing component is configured as a multifunctional part that complements more than two functional sections.

Advantageously, complexly structured flow cells having the multifunctional housing component according to the invention may be produced extremely efficiently with final assembly optionally of all functional sections in a single connection process. The invention thus provides an extraordinarily fabrication-friendly solution for a flow cell.

The housing component is expediently produced by the multiconstituent injection molding method. It is to be understood that injection molding may also be envisioned as a preferred production method for the substrate.

The housing component may be welded or/and thermally riveted to the substrate. Adhesive bonding is also possible. In the case of thermal riveting, leaktightness is established between the housing component and the substrate by clamping forces, by rivet pins that protrude from the substrate or housing component into through-openings in the respective other component being deformed under the effect of heat, so that they engage behind the through-opening. It is to be understood that lips preferably in the connection region may also be present on one or both components. For welding by ultrasound, projections as direction guides are expediently formed in the connection region.

The housing component may be connected in one piece to a tiltable closure element, particularly in order to cover a sample introduction opening example by means of a film hinge. Expediently, the closure element can be retained in the closure position and, for example, hermetically covers the sample introduction opening of the flow cell after introduction of a sample. The covering force, optionally reinforced by an actuation element of an operating instrument, of the closure element may additionally ensure the hermetic closure or on its own be essential for the hermetic closure.

In one particularly preferred embodiment of the invention, the housing part comprises a plurality of soft constituent sections, which in particular consist of an elastomer material. The soft constituent sections may comprise at least partially transparent soft constituent sections, such sections forming for example an inspection window.

In another configuration of the invention, the soft constituent sections comprise soft constituent sections locally welded or/and adhesively bonded to the substrate, in which case such local connection positions may, for example, be configured extending annularly around a cavity.

For example, curved pump elements or/and outwardly curvable membranes may be envisioned as soft constituent sections. Curved pump elements may be deformed manually, or by an actuation element of an operating instrument, in such a way that a pump volume formed by the pump element is modified.

Besides pump devices, for example, a storage chamber bounded by the housing component may be envisioned as s a functional section of the flow cell, in which case the storage chamber may be bounded only by the hard constituent of the housing component.

In the latter case, the storage chamber is expediently closed by predetermined breaking barriers in a feed and discharge channel.

A device, which comprises a soft constituent section, which can be deformed from the outside, of the housing component, for breaking a predetermined breaking barrier may furthermore be formed as a functional section of the flow cell. It is to be understood that such a device for breaking the predetermined breaking barriers may be used for the storage chamber described above. In order to form a storage chamber, which would be bounded by a deformable soft constituent of the housing component, breaking of a predetermined breaking barrier may be carried out, optionally by deformation of the chamber wall in question.

The soft constituent section of the device for breaking a predetermined breaking barrier expediently comprises an outwardly curvable membrane.

A septum, which comprises a soft constituent section, which can be pierced with a cannula, of the housing component may be formed as a further functional section of the flow cell.

In another configuration of the invention, a valve device, which comprises a soft constituent section, which can be deformed resiliently from the outside while closing a valve opening, of the housing component is formed as a functional section of the flow cell.

The soft constituent section of the valve device expediently comprises a membrane, which is optionally covered on the inside by a film.

A gas cushion, which comprises a soft constituent section, which can be deformed by an internal pressure in the flow cell while changing the gas cushion volume, may furthermore be envisioned as a functional section.

Such a soft constituent section may, for example, be formed by a membrane, the deflection of which by a plunger device of an operating instrument can be limited and may be adjusted. Such a soft constituent section may furthermore for example be formed by a curved pump element, the deflection of which by a plunger element simultaneously causes a pump action besides a modification of the gas cushion volume. In particular, a combination of at least two pump/gas cushion elements formed by soft constituent sections in combination with actuation elements, which deformed them, of an operating instrument, inside a flow cell hermetically closed from the surroundings may form a transport apparatus for fluids. Expediently, to this end, one of the pump elements is arranged upstream and a further one downstream of the fluid volume to be transported. In the case of an increased internal pressure of the flow cell compared to the ambient pressure, such an arrangement allows movements of the fluid volume both downstream and upstream, in which case the internal pressure may be adjusted in a controlled way by the degree of deflection of one or both pump/gas cushion elements.

In another configuration of the invention, a degassing apparatus, which removes a gas volume that is located between two fluid volume sections separated by a gas section, so that the two fluid volume sections are connected to one another after the degassing and may be fed to a further processing device of the flow cell, for example a sensor or a mixing or reaction chamber, is formed as a functional section of the flow cell. To this end, a deflectable soft constituent section, for example in the form of a curved pump element, is connected to a channel region, through which the fluid volume sections flow, of the flow cell, in such a way that a gas-permeable membrane that bounds the channel region is located between a volume, formed by the deflectable soft constituent section, and the channel region. For the degassing, the soft constituent section is deflected at an instant before the first fluid volume section has reached the channel region bounded by the membrane. The deflection is preferably carried out by the soft constituent section being pressed in by a plunger of an operating instrument. When the first fluid volume section has been pumped into the channel region close by the membrane, the plunger is retracted but the deflection of the soft constituent section remains because of the lack of venting.

In the volume region between the soft constituent section and the permeable membrane, a reduced pressure is created by the resilient restoring force of the soft constituent section, the effect of which is that the gas volume between the successive fluid volume sections pumped through the channel region escapes through the membrane and the successive fluid volume sections are thus connected to one another.

A chamber that receives the sample being introduced may be elongatedly shaped in such a way that sample introduction is possible by means of a rod carrying a swab, the rod having a predetermined breaking position. An elongate opening for introducing the rod with the swab may have a constriction at one end, which makes it possible to break the rod off at the predetermined breaking position, the swab containing the sample material and the rod end broken off remaining in the sample chamber.

It is to be understood that the above-described embodiments of functional sections could also be used in a flow cell when fewer than three functional sections are complemented by the housing component.

BRIEF DESCRIPTION OF THE DRAWING

The invention is explained in more detail below with the aid of exemplary embodiments and the appended drawings which relate to these exemplary embodiments, in which:

FIG. 1 shows a flow cell according to the invention in a plan view obliquely from above with the sample introduction opening open and closed, FIG. 2 shows the flow cell of FIG. 1 in an exploded representation.

DETAILED DESCRIPTION OF THE INVENTION

Figure 3:
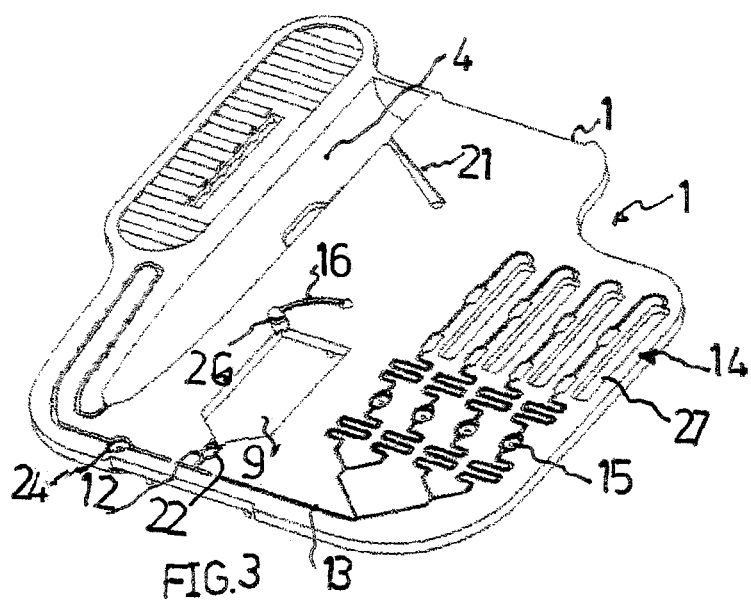
FIG. 3 shows a substrate of the flow cell of FIGS. 1 and 2, FIGS. 4 to 7 show representations explaining connections between a substrate and the housing component of the flow cell of FIGS. 1 to 3.

A flow cell for carrying out analysis comprises an essentially plate-shaped substrate 1 which is produced by the injection molding method from a plastic, preferably from PP, PE, PMMA, PC, COC or COP.

The substrate 1 is connected to a housing component 2, which is configured in its basic shape as a plate and covers, in the example shown partially, the substrate 1 on a plate side. The housing component 2 is produced as a composite part from a hard constituent and a soft constituent by the two-constituent injection molding method. The hard constituent consists for example of PP, and the soft constituent of an elastomer, in particular a thermoplastic elastomer, or silicone. The soft constituent could be at least partially transparent.

On its side facing away from the housing component 2, the substrate 1 is connected to a film 3, which closes cavities formed in the substrate 1 and is adhesively bonded or welded to the substrate 1. Preferably, the film 3 consists of the same material as the substrate 1.

The substrate 1 comprises a sample chamber 4, which is configured as an outward curvature of the substrate plate, is covered by the film 3 and has a sample introduction opening 5. The sample introduction opening 5 can be closed by a tab 6, which is articulatedly connected by means of a film hinge to the housing component 2 and can be latched in an opening 7 of a profiled grip part 8 of the substrate 1.

The substrate 1 furthermore comprises a recess 9 which, together with a bulge 10, oriented towards the recess 9, in the hard constituent of the housing component 2, forms a storage chamber 11 for a liquid reagent. As may be seen particularly in FIG. 3, a channel 12 having a predetermined breaking barrier 22 is formed between the recess 9, which forms the storage chamber 11, and a channel structure 13, and by means of the channel structure 13 a connection may be established both to the sample chamber 4 and to an analysis section 14, which is essentially formed by the substrate 1 and film 3. In the example shown, the analysis section 14 comprises four insertion openings for plug-shaped carriers 15 of a dry reagent.

By means of a further channel 16 having a predetermined breaking barrier 26, the storage chamber 11 can be connected to a pump volume 18 which is formed by a curved section 17 of the soft constituent of the housing component 2. A further pump volume 20, formed by a curved section 19 of the soft constituent, is connected via a channel 21 to the sample chamber 4.

In order to use the flow cell described above, a sample to be analyzed is introduced through the sample introduction opening 5 into the sample chamber 4, and the sample chamber 4 is subsequently closed by pressing down the closure tab 6. It is to be understood that, on its side facing toward the sample introduction opening 5, the closure tab 6 comprises a sealing element that closes the opening, as is described in more detail below with the aid of FIG. 13. Optionally, a pressing force of the closure tab 6 against the sample introduction opening 5, achieved by latching with the opening 7, is reinforced with the aid of an operating instrument (not shown here or below) that receives the flow cell, for example by mechanical plunger pressure.

The hermetically closed flow cell is arranged in a predetermined position in an operating instrument so that sample material accumulates at the exit of the sample chamber 4 because of the force of gravity, and air bubbles that may occur rise in the desired direction upward inside the hermetically closed flow cell.

By mechanical actuation of the curved section 17 forming a pump element and a consequent reduction in the pump volume 18, after opening of the predetermined breaking barriers 22 and 26 and of a valve 23 by the operating instrument, liquid reagent is conveyed from the storage chamber 11 into the sample chamber 4 while building up an internal pressure in the flow cell which is higher than atmospheric pressure. Actuation of the section 19 forming a further pump while reducing the pump volume 20 allows transport of the liquid reagent mixed with the sample back into the storage chamber 11, this reagent coming in contact with a dry reagent of a plug-shaped dry reagent carrier 24 both during the forward transport and during the backward transport. By alternate actuation of the sections or pump elements 17, 19, full washing of the dry reagent from the dry reagent carrier 24 and mixing of the liquid reagent with the sample take place. The mixture of sample material and reagents, which is again located in the sample chamber 11 after completed washing out, is transferred from the storage chamber 11 into the analysis section 14 after the valve 23 is closed and a valve 25 is opened, and the fluid material is divided into four aliquots. In the hermetically closed flow cell, the movement of the liquid inside the analysis section takes place against the pressure of an air cushion 27, as is described in FIG. 18. By actuation of the pump element 17, the fluid material inside the analysis section can be moved to and fro as required. During the transport of the fluid material against the air cushion 27, a pressure buildup takes place, which typically lies in the range of from 0.1 to 5 bar above atmospheric pressure. An internal pressure of 1-2 bar is advantageous for carrying out the heat treatment steps in the analysis section 14, as are conventional for example in PCR or lysis processes, liquids being heated up to 100° C. The internal pressure built up by the liquid transport can prevent or reduce degassing of the heat-treated liquids. The analysis section comprises detection sections for recording the analysis result.

After the end of the analysis, all the actuation elements of an operating instrument are brought into the initial position at the instant of inserting the flow cell into the operating instrument. The pump elements 17 and 19 therefore return to their initial shape and the internal pressure advantageously increased in the flow cell during the analysis is reduced back to atmospheric pressure. In conjunction with hermetic closure of the flow cell, this reduction advantageously prevents undesired egress of the analyzed sample mixture when disposing of the flow cell.

Exemplary embodiments of functional sections, which fulfil various functions, of flow cells, are described below, such as may for example be used in the above-described flow cell comprising a housing component having a hard and a soft constituent.

Figure 4:
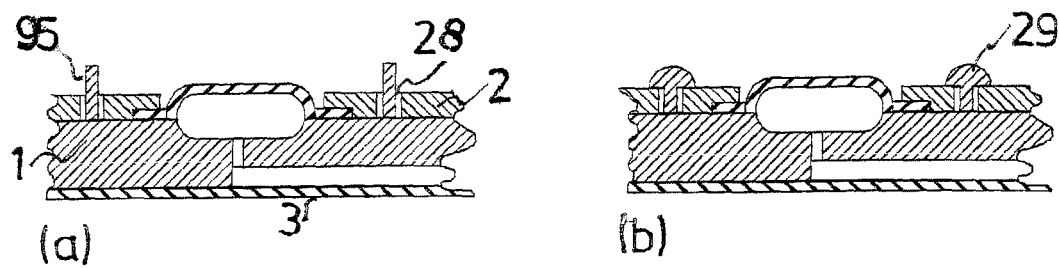

A first variant of the connection of the housing component 2 to the substrate 1, in particular for fluid-tight and/or hermetically connection of the soft constituent of the housing component 2 to the substrate 1, relates to thermal riveting according to FIG. 4. Rivet pins 95 connected in one piece to the substrate 1 and protruding from the substrate 1 extend through corresponding openings 28 in the hard constituent of the housing component 2, as may be seen from FIG. 4a. According to FIG. 4b, the rivet pins 95 are thermally deformed to form mushroom heads 29 engaging behind the openings 28, so that the housing component 2 is clamped between the substrate 1 and the mushroom heads 29.

Figure 5:
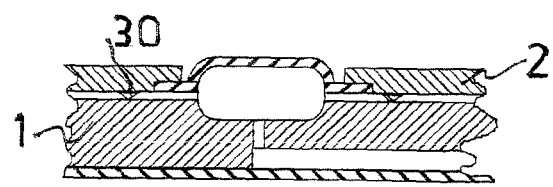

FIG. 5 indicates the possibility of ultrasound welding of the housing component 2 to the substrate 1, the hard constituent of the housing component 2 being provided with prismatic direction guides 30 optionally extending around a soft constituent section. When ultrasound is applied, the direction guides 90 melt and weld to the surface of the substrate 1.

In the exemplary embodiments shown in FIGS. 4 and 5, fluid-tight or hermetic connection takes place between the soft constituent of the housing component 2 and the substrate 1 by pressure and clamping.

Figure 6:
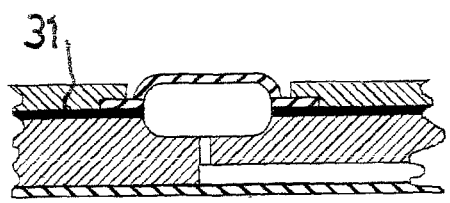

FIG. 6 shows an exemplary embodiment in which the housing component 2 and the substrate 1 are adhesively bonded to one another, in the example shown by a double-adhesive adhesive tape 31.

Figure 7:
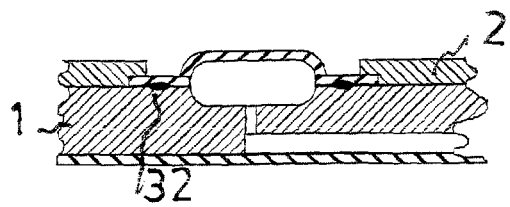

FIG. 7 shows connection of a housing part 2 to a substrate 1, in the case of which a soft constituent section of the housing component 2 is adhesively bonded or welded at 32 locally to the substrate 1. The connection could also be configured continuously circumferentially.

Figure 8:
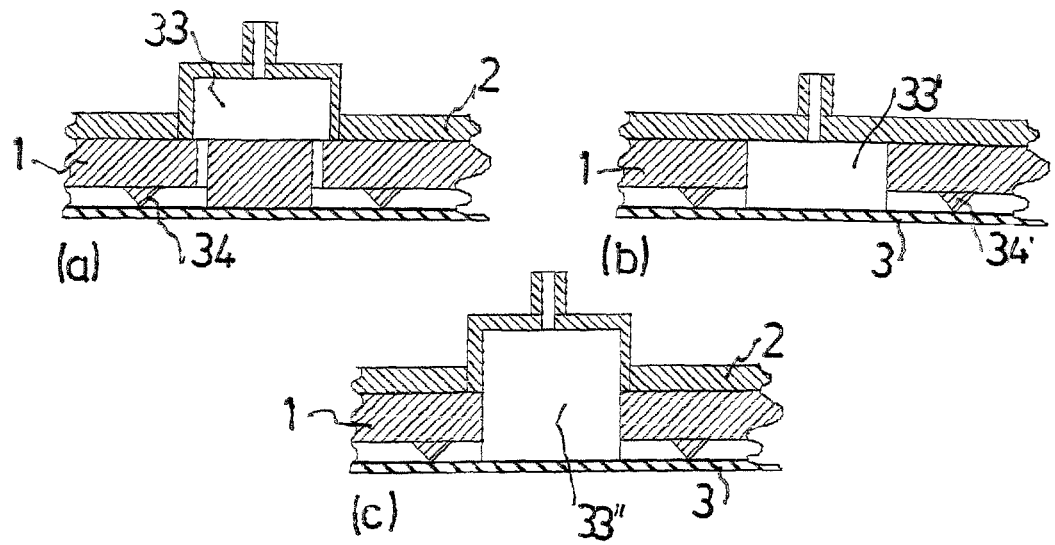
FIG. 8 shows various embodiments of a storage chamber in a flow cell according to the invention.

FIG. 8 shows three different possibilities of the formation of a storage chamber for a liquid. In the case of the exemplary embodiment of FIG. 8a, a storage chamber 33 is formed only by a bulge of the hard constituent of the housing component 2.

In the case of the exemplary embodiment of 8b, the formation of a storage chamber 33' takes place only using a recess in the substrate 1.

FIG. 8c shows a storage chamber 33", corresponding to the storage chamber 11 described above, which is formed both by a bulge of the housing component 2 and by a recess in the substrate 1. In all variants 8a to 8c, the storage chamber 33, 33' or 33" is respectively closed on the entry and exit sides by breakable predetermined breaking barriers 34, 34'. A prismatic barrier member closes the channel and is adhesively bonded or welded at the apex to the film 3.

Figure 9:
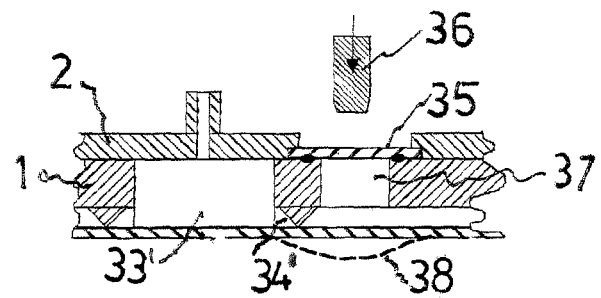
FIG. 9 shows a device for breaking a predetermined breaking barrier of a storage chamber.

In order to break the predetermined breaking barriers 34, 34', an arrangement provided in FIG. 9 by way of example for the predetermined breaking position 34' is respectively envisioned. A membrane 35, made of an elastomer material, welded fluid-tightly circumferentially to the substrate 1 is a part of the soft constituent of the housing component 2 and can be stretched by an actuation element 36 of an operating instrument into a through-opening 37 in the substrate 1 until it deflects the film 3 adhesively bonded or welded to the substrate 1 according to the dashed line 38 so that the predetermined breaking barrier 34' breaks. By the deflection of the film 3, the film 3 tears off from the apex of the prismatic barrier member closing the channel.

Figure 10:
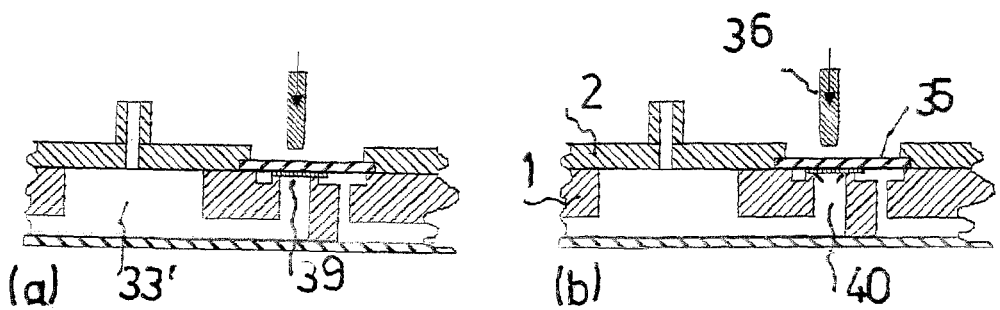
FIG. 10 shows a further device for breaking a predetermined breaking barrier of a storage chamber.

A predetermined breaking barrier shown in FIG. 10 is formed by a barrier film 39 which covers a through-opening 40 in the substrate 1 that is in fluid connection with the storage chamber 33' and, in particular, bears against an annular projection enclosing the through-opening 40 and is welded tightly thereto, in order to ensure hermetic closure of the storage chamber at least partially filled with the liquid for the period of time between production and use of the flow cell. An actuation element 36 of an operating instrument stretches an elastomer membrane 35, which is a part of the soft constituent of the housing component 2, in such a way that the barrier film 39 breaks while opening the predetermined breaking barrier. Advantageously, the elastomer membrane 35 does not come in contact with the liquid stored in the storage chamber 33' so long as the predetermined breaking barrier is not removed. A material that is compatible in the long term with the liquid in the flow cell is therefore not needed for the membrane 35.

Figure 11:
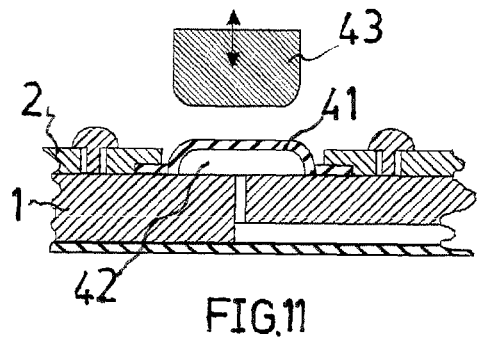
FIGS. 11 to 13 show further exemplary embodiments of functional sections of a flow cell according to the invention.

A functional section, shown in FIG. 11 and fulfilling a pump function, as already similarly described above with the aid of FIGS. 1 to 3, of a flow cell comprises a curved pump element 41, made of elastomer material, forming a pump volume 42. The pump element 41 is a part of the soft constituent of the housing component 2 connected to the substrate 1 in this case by riveting. The pump element 41 is intended for actuation by an actuation element 43 of an operating instrument. The delivery flow may be controlled by adjusting the rate of advance of the actuation element 43 and furthermore depends on the geometry of the actuation element 43. The pump element 41 is resilient and has a restoring moment such that a delivery flow in the opposite direction can be produced by the pump element when being restored.

Figure 12:
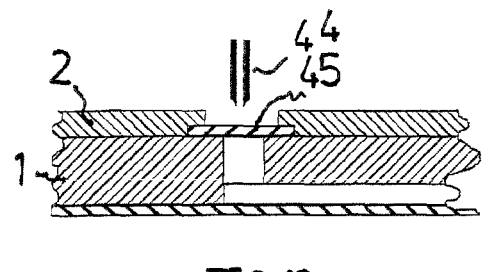

A functional section, represented in FIG. 12, of a flow cell comprises a membrane 45 made of elastomer material, which is formed by the soft constituent of the housing component 2 connected to the substrate 1. The membrane 45 made of elastomer material forms a septum, which can be pierced with a cannula 44 and through which material can be introduced into the flow cell before or after an analysis.

Figure 13:
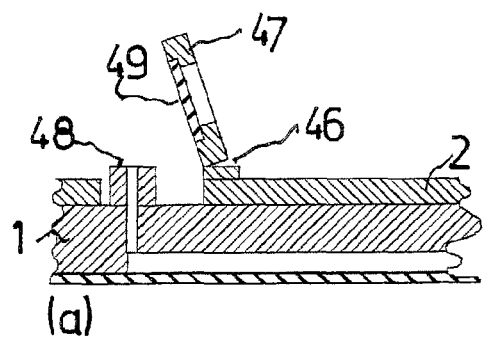
Figure 13:
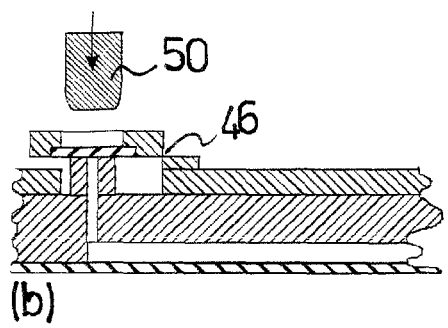

FIG. 13 shows a closure tab 47, connected in one piece to the housing component 2 by means of a film hinge 46, for covering a sample introduction opening 48 of the flow cell. The tab comprises an elastomer membrane 49, which is a part of the soft constituent of the housing component 2 and seals the sample introduction opening 48. An actuation element 50 of an operating instrument ensures hermetic closure of the sample introduction opening.

Figure 14:
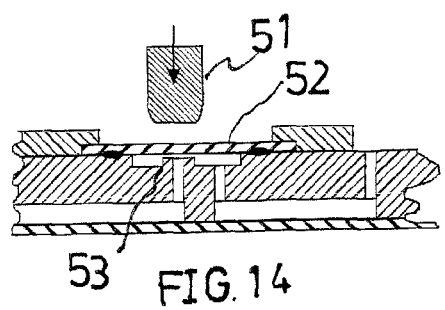
FIGS. 14 and 15 show exemplary embodiments of the valves in a flow cell according to the invention.
Figure 15:
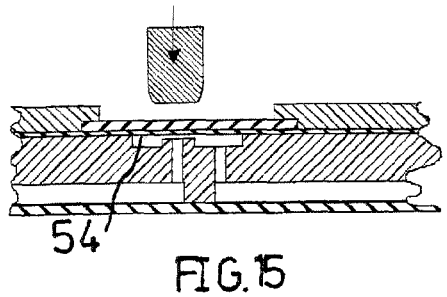

FIGS. 14 and 15 show exemplary embodiments of a functional section, fulfilling a valve function, of a flow cell. An elastomer membrane 52, which is a part of the housing component 2 connected to the substrate 1, may in the closed state of the valve be pressed by an actuation element 51 of an operating instrument against a raised valve seat 53. The valve opens when the pressure due to the actuation element 51 is released.

The functional section of FIG. 15 differs from the functional section of FIG. 14 in that the elastomer membrane 52 is covered on its side facing toward the valve seat 53 by a plastic film 54 that prevents direct contact of the elastomer membrane 52 with liquid inside the flow cell.

Figure 16:
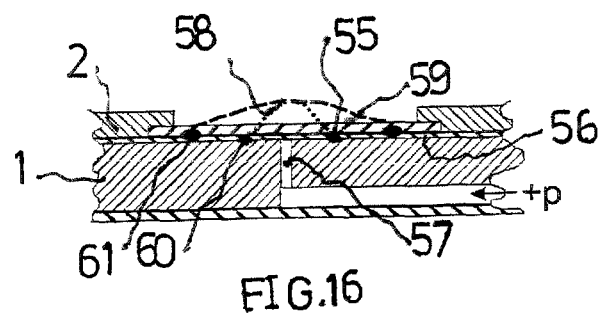
FIGS. 16 and 17 show exemplary embodiments of pump devices in a flow cell according to the invention.

FIG. 16 shows a pump (or a valve) which can be actuated by applying a pressure p and has a housing component 2, comprising an elastomer membrane 55, and a substrate 1. The housing component 2 is connected to the substrate 1 by means of an extensible film 56, which can be stretched over a pressure application channel 57 according to the dashed line 58, the elastomer membrane 55 being stretched and a volume 59 being generated between the elastomer membrane 55 and the film 56. Respectively, the film 56 is connected to the substrate 1 by an annular weld seam 60 and the elastomer membrane 55 is connected to the film 56 by an annular weld seam 61.

Figure 17:
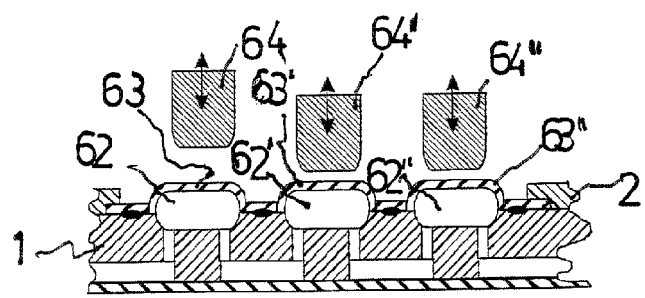

A pump shown in FIG. 17, operating according to the peristaltic principle comprises three pump chambers 62, 62',62" connected in series, which are formed between the substrate 1 and outwardly curved pump elements 63, 63', 63". The pump elements, consisting of elastomer material, are a part of the soft constituent of the housing component 2. In order to convey fluid, actuation elements 64, 64',63" of an actuation instrument act successively on the outwardly curved pump elements 63, 63',63". In order to form the pump chambers 62, 62',62", in the example shown the substrate 1 is respectively indented.

In an alternative variant, the soft constituent, forming the pump elements 63, 63',65", of the housing component 2 is covered by a barrier film so that the soft constituent does not come in contact with the fluid in the flow cell and materials incompatible with the fluid may be used for the soft constituent.

Figure 18:
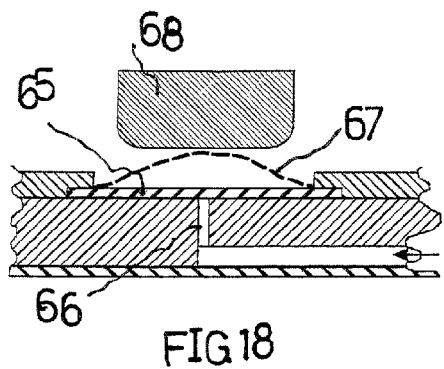
FIG. 18 shows an exemplary embodiment of a gas cushion in a flow cell according to the invention.

FIG. 18 shows a flow cell having a substrate 1 and a housing component 2, the soft constituent of which comprises an elastomer membrane 65 that bounds a gas cushion. Air pressure increasing in a channel 66 makes the elastomer membrane 65 bulge out according to the dashed line 67. An actuation element 68 of an operating instrument can control the deflection of the elastomer membrane and therefore the volume of the gas cushion. It is to be understood that a gas cushion volume may be formed not just by deflection but in advance by shaping of the elastomer membrane and/or by indentation of the substrate 1.

Figure 19:
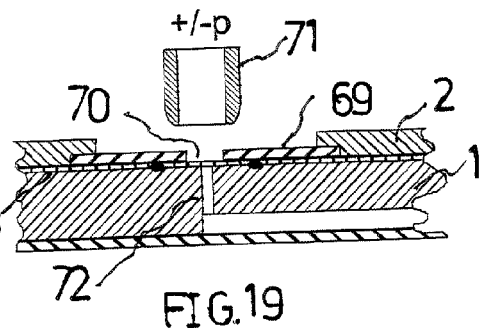
FIG. 19 shows an exemplary embodiment of a clamp connection in a flow cell according to the invention.

FIG. 19 shows a functional section of a flow cell, by which section a hermetically tight connection to a line, leading for example to a pump, of an operating instrument may be established. An elastomer membrane 69, which is a part of the soft constituent of the housing component 2, comprises an opening 70 to which, for example, a connecting line 71 of an operating instrument may be connected while exerting an application pressure. A channel 72 in the substrate 1, which is connected to the opening, is covered by a film 73 which is adhesively bonded or welded to the substrate and is permeable for air but impermeable for liquids and vapors. The flow cell may therefore have pressure applied to it through the line 71 and, for example in conjunction with a pneumatic valve of an operating instrument, form a switchable vent opening or switchable gas cushion for controlling the liquid transport in the flow cell.

Figure 20:
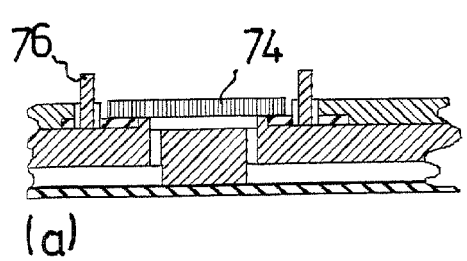
FIG. 20 shows a flow cell according to the invention having a sealing ring, formed by a soft constituent of a housing component, for sealing a sensor element.
Figure 20:
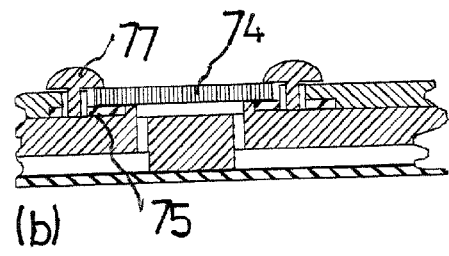

FIG. 20 shows a functional section of a flow cell, which is used for clamp connection of the flow cell to a sensor element 74 or other component made of a material which cannot be connected directly either to the substrate 1 or to the housing component 2. An annular sealing element 75 made of elastomer, which seals the sensor element 74 against the substrate 1, is a part of the soft constituent of the housing component 2. For the clamp connection between the sensor element 74 and the substrate 1, rivet pins 76 protruding from the substrate 1 are used which are deformed to form a mushroom head 77 pressing the sensor element 74 against the sealing ring 75.

Figure 21:
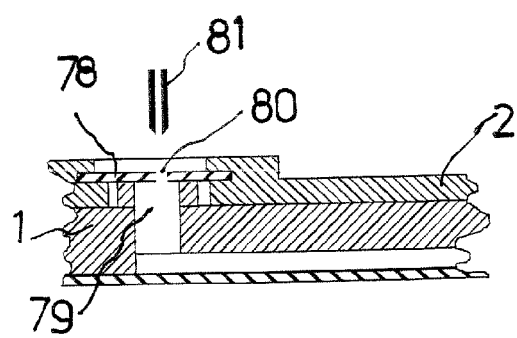
FIG. 21 shows a sample introduction opening of a flow cell according to the invention, which is covered by a slitted soft constituent section of the housing component.

FIG. 21 shows a functional section of a flow cell having a substrate 1 and a housing component 2, the soft constituent of which comprises an elastomer membrane 78. The elastomer membrane 78 closes a sample introduction opening 79 of the flow cell. A slit 80 in the elastomer membrane ensures that a pipette 81 introducing the sample is firmly enclosed and spraying of sample material or reagent liquid cannot occur. After the sample introduction, the sample introduction opening 79 is hermetically sealed by a closure element (not shown).

The elastomer membrane 78, which closes the introduction opening and comprises the slit 80, may also advantageously be used when the flow cell comprises devices for generating reduced pressure in the sample introduction channel, in which case the reduced pressure may, for example, be generated by outwardly curved pump elements described above. For example, a capillary tube, which has a blood sample and is inserted through the slit, may then be drained by the reduced pressure, the elastomer membrane 78 closing and sealing the tube.

Figure 22:
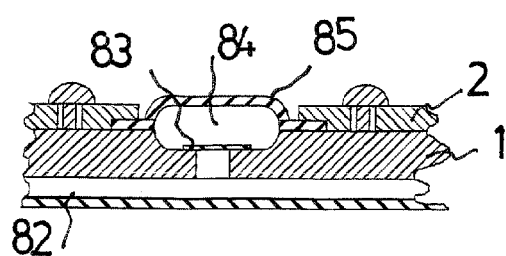
FIG. 22 shows an arrangement for removing gas bubbles from a fluid flowing in a flow cell according to the invention.

FIG. 22 shows a functional section of a flow cell having a substrate 1 and a housing component 2, the functional section being used to remove air bubbles from a liquid flowing in a channel 82. The channel 82 is connected to a pump volume 84 by means of a membrane 83 which is air-permeable but impermeable for liquids. By means of an outwardly curved pump element 85, which is a part of the soft constituent of the housing component 2, a reduced pressure may be generated as described above, so that air can pass from the liquid into the pump volume.

Figure 23:
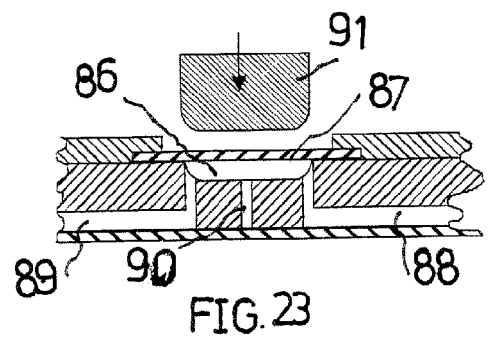
FIGS. 23 and 24 show exemplary embodiments of flow cells according to the invention having a device for measuring a sample quantity.

FIG. 23 shows a functional section of a flow cell comprising a substrate 1 and a housing component 2, which section makes it possible to meter a sample quantity to be processed in the flow cell.

A flow chamber 56, which is formed by an indentation in the substrate 1 and has a defined volume, is covered by an elastomer membrane 87 which is a part of the soft constituent of the housing component 2. An entry channel 88 of the flow chamber 86 is connected to the sample introduction opening of the flow cell, and one exit channel 89 connects the flow chamber 86 to a vent opening (not shown). A further exit channel 90 of the flow chamber 86 connects the flow chamber to the channel system, required for the processing and analysis, of the flow cell and is closed outward. A sample is pressed by the user into the sample introduction opening of the flow cell, the flow chamber 86 being filled and excess material escaping through the channel 89. The channel 90 (perpendicular to the channels 88, 89) is not vented. After the sample introduction, the sample introduction opening at the entry of the flow cell, i.e. of the channel 88, as well as a vent opening at the exit of the channel 89 are tightly closed by means of a cap, a stopper or a tape (with or without assistance by the operating instrument). The lowering of a plunger 91 in an operating instrument leads to a volume displacement of the sample volume metered in the flow chamber 86 into the channel 90 and the subsequent channel system, required for the processing and analysis, of the flow cell. In the same way, an aliquot of a sample mixture or of another liquid quantity may also be metered during the analysis or sample processing.

Figure 24:
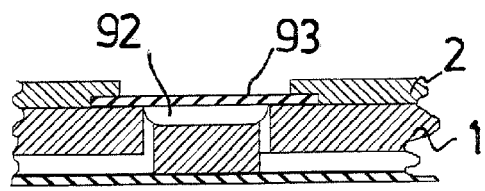

FIG. 24 shows a functional section of a flow cell having a component 2 and a flow chamber 92. An elastomer membrane 93, which is transparent and is a part of the soft constituent of the housing component 2, forms an inspection window for monitoring the filling of the flow cell with liquid sample or for monitoring the liquid transport during the analysis.

The invention claimed is:

1. A microfluidic flow cell for carrying out an analysis, comprising:
   a predetermined breaking barrier;
   a plastic plate having cavities for forming channels and chambers;
   a film adhesively bonded or welded to the plastic plate-so as to close the cavities on a first face of the plastic plate; and
   a plate shaped injection molded composite housing consisting of a rigid hard component and a deformable soft component, wherein
   the plate shaped composite housing is connected to a second face of the plastic plate facing away from the first face by welding, riveting or adhesive bonding, the deformable soft component comprising a plurality of elastically deformable soft component sections, wherein
   the plate shaped injection molded composite housing is configured to complement functional sections of the flow cell that each fulfill a function of the flow cell and is configured as a multifunctional part that complements more than two functional sections of the flow cell in a single joining process, and wherein
   the rigid hard component of the plate shaped injection molded composite housing complements a storage chamber as a functional section of the flow cell, and wherein
   one of the functional sections is a device for breaking the predetermined breaking barrier, the device including a section of the deformable soft component of the plate shaped injection molded composite housing that is externally deformable, wherein
   a membrane is part of the deformable soft component of the plate shaped injection molded composite housing and is an elastomer material welded fluid-tightly to the plastic plate, the membrane capable of being stretchable by an actuation element of an operating instrument into a through-opening in the plastic plate so as to deflect the film adhesively bonded or welded to the plastic plate so that the predetermined breaking barrier breaks wherein the predetermined breaking barrier is an apex of a prismatic barrier member of the plastic plate to which the film is adhesively bonded or welded, and wherein
   the membrane is arranged at a distance from the film and the through-opening is between the membrane and the film.

2. The flow cell according to claim 1, further comprising a tiltable closure element, wherein the plate shaped injection molded composite housing is connected in one piece to the tiltable closure element.

3. The flow cell according to claim 2, wherein the tiltable closure element is retainable in a closed position.

4. The flow cell according to claim 1, wherein the soft constituent sections comprise an elastomer material.

5. The flow cell according to claim 1, wherein the soft constituent sections comprise at least partially transparent soft constituent sections.

6. The flow cell according to claim 1, wherein the soft constituent sections comprise soft constituent sections locally welded or adhesively bonded to the substrate.

7. The flow cell according to claim 1, wherein the predetermined breaking barrier is arranged in a feed and discharge channel so as to close the storage chamber.

8. The flow cell according to claim 1, wherein the soft component section comprises an outwardly curved or outwardly curvable membrane.

9. The flow cell according to claim 1, wherein one of the functional sections is a septum that comprises a section of the deformable soft component of the plate shaped injection molded composite housing that can be pierced with a cannula.

10. The flow cell according to claim 1, wherein one of the functional sections is a valve device that comprises a section of the soft component of the housing that is resiliently deformable from outside while closing a valve opening.

11. The flow cell according to claim 1, wherein one of the functional sections is a gas cushion that comprises a section of the soft component of the plate shaped injection molded composite housing that is deformable by an internal pressure in the flow cell while changing a volume of the gas cushion.

* * * * *